(No Model.)

M. V. B. STEVENSON.
FEED TROUGH.

No. 395,855. Patented Jan. 8, 1889.

WITNESSES:
W. R. Davis.
C. Sedgwick.

INVENTOR.
M. V. B. Stevenson
BY Munn & Co.
ATTORNEY

UNITED STATES PATENT OFFICE.

MARTIN VAN BUREN STEVENSON, OF JESUP, IOWA.

FEED-TROUGH.

SPECIFICATION forming part of Letters Patent No. 395,855, dated January 8, 1889.

Application filed May 22, 1888. Serial No. 274,733. (No model.)

*To all whom it may concern:*

Be it known that I, MARTIN VAN BUREN STEVENSON, of Jesup, in the county of Buchanan and State of Iowa, have invented a new and useful Improvement in Feed-Boxes, of which the following is a full, clear, and exact description.

My invention relates to an improvement in feed-boxes, and has for its object to provide a means whereby the animal will be compelled to eat slowly, and also wherein the feed will be fed continuously and freely; and the further object of the invention is to provide a simple, durable, and economical box.

The invention consists in the construction and combination of the several parts, as will be hereinafter fully described, and pointed out in the claims.

Reference is to be had to the accompanying drawings, forming a part of this specification, in which similar figures of reference indicate corresponding parts in both the views.

Figure 1:
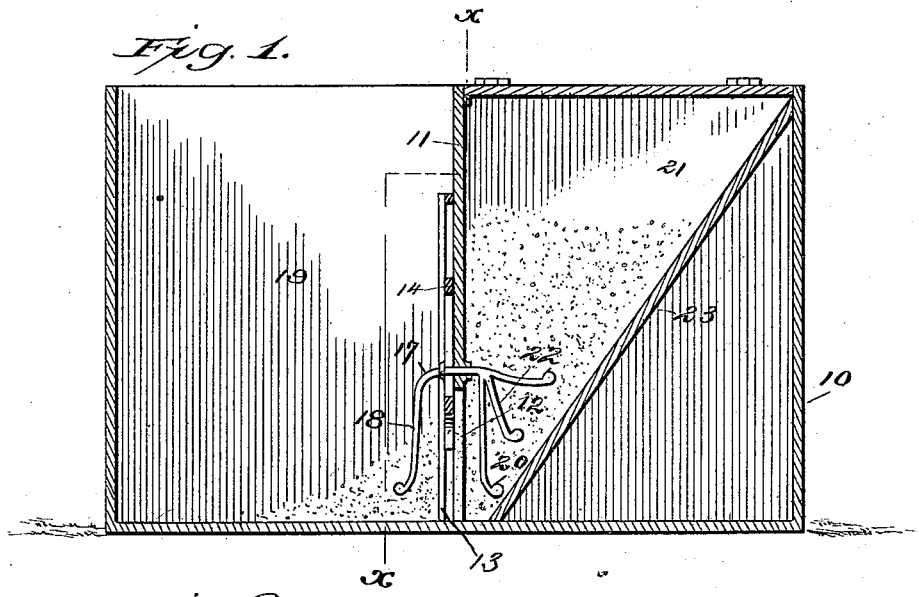
Figure 2:
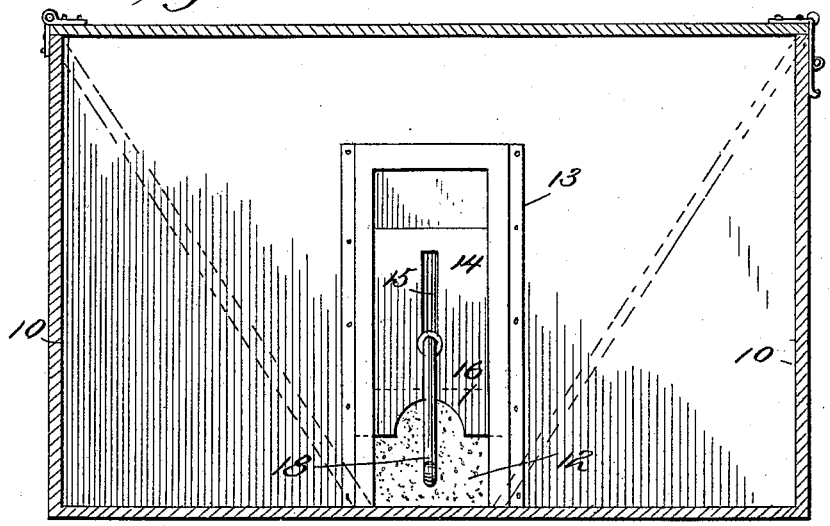

Figure 1 is a longitudinal vertical section through the box. Fig. 2 is a transverse section partially on line $x\ x$ of Fig. 1.

In carrying out the invention, the box 10 is divided preferably at the center by a vertical transverse partition, 11, in which partition at or about the center, and in a lower portion of the same, an opening, 12, is formed. The said opening 12 is surrounded by ways 13, which ways extend vertically upward from the floor of the box to a point at or near the top. In the said ways 13 a slide, 14, is fitted, in which slide a vertical slot, 15, is produced. The slide 14 at its lower edge is cut away, as best shown at 16 in Fig. 2.

A trigger-like bar, 17, is passed through the slot 15 of the slide 14, and also through the partition 11, as best shown in Fig. 1, the said bar being adapted to have a rotatory reciprocating motion. The bar 17, which may be termed an "agitator," is preferably made essentially U-shaped. One member, 18, thereof extends normally downward in the feeding-compartment 19 of the box, and the other member, 20, extends down in a similar manner within the feed or storage compartment 21 of the said box.

At or near the intersection of the arm 20 of the agitating-bar with the horizontal body a number of auxiliary arms, 22, are attached, which latter arms may be of any desired or approved shape.

The storage or feed compartment 21 of the box is provided with an inclined bottom, 23, which bottom extends from the upper edges of the compartment and projects downward to the floor within a short distance of the opening in the center partition, 11, as is shown by the full and dotted lines in the drawings.

Each of the several compartments of the box may be provided with an independent lid, or one lid may be made to cover both; or the compartment 19 may be left without a lid, if in practice it be found desirable.

In operation, the feed is stored or placed in the compartment 21, and by reason of the inclined bottom of the said compartment the feed runs freely down against the central partition, 11. The slide 14 is elevated to uncover the opening 12 as far as desired to admit of greater or less amount of feed passing from the storage-compartment 21 into the feeding-compartment 19.

It is evident that as the horse or other animal feeds from the compartment 19 it must of necessity bring its nostrils close to the bottom, and in the efforts of the animal to obtain the feed the arm 18 of the U-shaped bar 17 is reciprocated more or less, which motion is also communicated to the opposite arm 20 and the arms 22, thereby suddenly sending the grain or feed in the compartment 21, and preventing the same from clogging around the aperture 12 in the central partition, 11, and insuring the free and uninterrupted flow of the feed or grain into the feeding-compartment 19. The slide 14 may be so adjusted that it will require at least half a day for an animal to consume a quart of feed. One of the great benefits derived from the use of a box constructed as above set forth is, that an animal coming in hungry cannot plunge his head to the bottom of a box full of grain and waste the same, but must of necessity take but a small quantity at a time, whereby the thorough mastication of the food is insured.

I desire it to be distinctly understood that I do not confine myself to any particular form of the agitating-bar, as the same may be greatly varied.

Having thus described my invention, what I claim as new, and desire to secure by Letters Patent, is—

1. The combination, with a feed-receptacle having an outlet in one side, of a laterally-swinging U-shaped agitator journaled above said outlet, with its arms depending in front and rear thereof, substantially as set forth.

2. In a feed-box, the combination, with a receptacle and a partition dividing the same into two compartments, the said partition being provided at the base with an opening, of a slide reciprocating over said opening, and an essentially U-shaped agitating-bar passing through said slide and journaled in said partition above said opening, the said bar having arms extending downward in each of the compartments, as and for the purpose specified.

3. In a feed-box, the combination, with a receptacle and a partition dividing the same into two compartments, the said partition provided with an opening at the base, of an inclined false bottom secured in one of the compartments, a slide covering the opening in the partition, and an essentially U-shaped agitating-bar passing through the said slide and journaled in the partition, and having arms extending vertically downward within each of the compartments, as and for the purpose specified.

MARTIN VAN BUREN STEVENSON.

Witnesses:
WM. H. SIEGFRIED,
EDWARD J. LOWN.